C. A. MILLER.
VEHICLE SPRING.
APPLICATION FILED NOV. 13, 1915.
1,189,375.
Patented July 4, 1916.
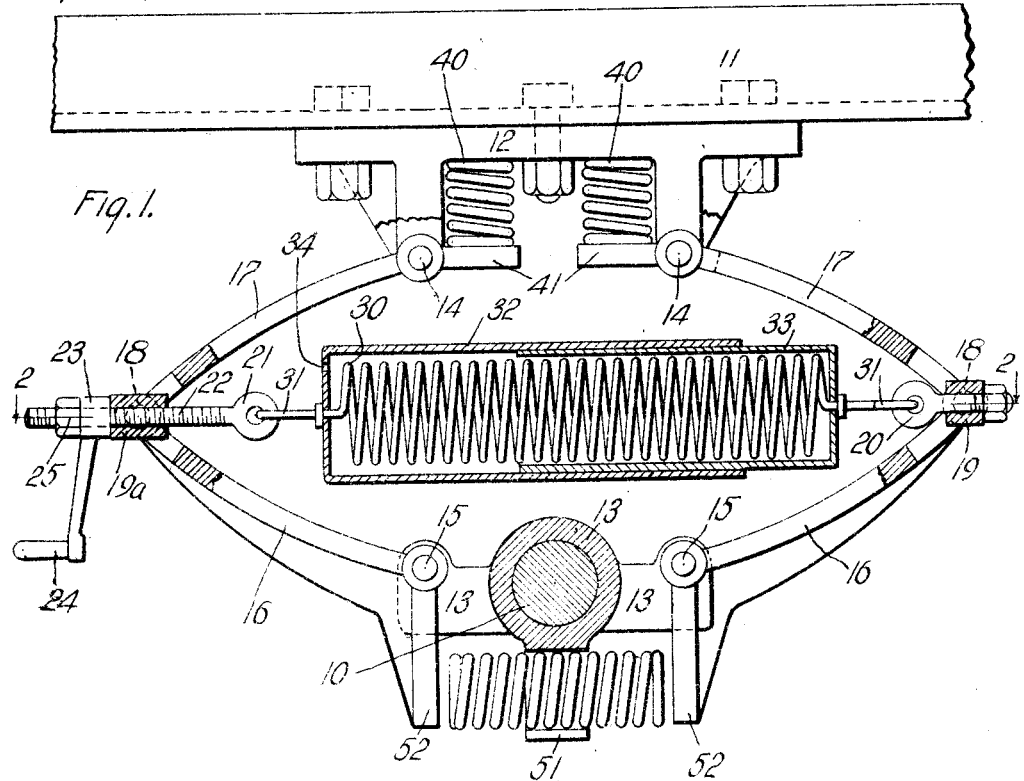
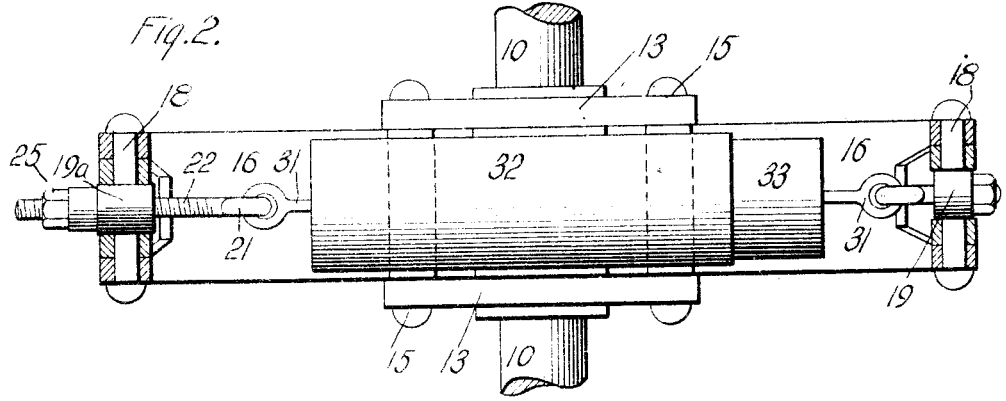
Witness
Edward H. Barkelew
Inventor
Carl A. Miller
by James T. Barkelew
his Attorney.

UNITED STATES PATENT OFFICE.

CARL A. MILLER, OF LOS ANGELES, CALIFORNIA.

VEHICLE-SPRING.

1,189,375.   Specification of Letters Patent.   Patented July 4, 1916.

Application filed November 13, 1915. Serial No. 61,297.

*To all whom it may concern:*

Be it known that I, CARL A. MILLER, a citizen of the United States, residing at Los Angeles, in the county of Los Angeles, State of California, have invented new and useful Improvements in Vehicle-Springs, of which the following is a specification.

This invention relates to springs for automobiles and other vehicles; and it is one of the objects of this invention to provide a simple, reliable and efficient spring mechanism which will absorb all shocks and irregular movements of the vehicle axle and prevent their being transmitted to the vehicle frame.

It is another object of this invention to provide a spring device in which ordinary coiled springs may be used instead of the flat leaf springs now commonly used.

The features of my invention will be understood from the following specification, wherein I describe a preferred form of spring device embodying my invention, reference being had to the accompanying drawings in which—

Figure 1 is a side elevation, with parts in section, showing my improved spring device, and Fig. 2 is a horizontal section taken as indicated by line 2—2 on Fig. 1.

In the drawings the numeral 10 designates a vehicle axle and 11 designates a vehicle frame. I mount upon the frame and axle, respectively, upper and lower seats 12 and 13, preferably of the configuration shown. The upper seat carries a pair of pivots 14 while the lower seat carries a similar pair of pivots 15 vertically below the pivots 14. Links 16 and 17 are mounted in pairs upon these pivots 14 and 15; the links of each pair being pivotally connected together at 18, as is clearly shown in the drawings. One lower link 16 and one upper link 17 constitute a pair; and the two pairs of links are arranged in the configuration shown, lying in a substantially diamond configuration with the pivotal connections 18 horizontally opposite each other. Each of the pivotal connections 18 carries a small swivel block 19 or 19ª. The block 19 carries a simple eye bolt 20, while the block 19ª has an eye bolt 21 having a long screw threaded shank 22 on which a nut 23 is adapted to work. Nut 23 may have a small crank handle 24 for convenience in adjusting the nut on the bolt 22, thereby to adjust the position of the bolt with reference to the block 19ª. A lock nut 25 may also be used to lock the parts in position when once set.

A suitable coiled tension spring 30 is connected between the two eye bolts 20 and 21, the ends 31 of the tension spring engaging with the eye bolts as illustrated. The tension of the spring 30 may be adjusted by adjusting the eye bolt 21 in the manner explained. The spring 30 is preferably surrounded by a telescoping casing consisting of two telescoping cylinders 32 and 33; and a small port 34 may be provided in one of the cylinders, if desired, so that when the spring 30 is extended the two cylinders will be drawn apart and the formation of a partial vacuum within the cylinders will retard the expansion of the spring, and will therefore retard the movement of the two pivotal points 18 away from each other. The in rush of air through the port 34 will at least partially fill the cylinders in their expanded position; so that upon the subsequent contraction of the spring, said contraction will be more or less opposed by the pressure raised within the cylinders when the air therein is compressed and forced out of the port 34.

Upward movement of the vehicle frame 11 will move the pivotal points 18 toward each other, and will allow the spring 30 to contract; while downward movement of the vehicle frame will move the pivotal points 18 away from each other and will expand the coiled spring 13. The coiled spring will therefore resist, by its resistance to expansion, the downward movement of the vehicle frame 11. To resist upward movement of the vehicle frame I may provide springs 40 in the position shown, said springs being short coiled springs confined between the upper seat 12 and the horizontal extensions 41 of the upper links 17. When the vehicle frame 11 moves upwardly, the upper links 17 move downwardly about the pivots 14, and the extensions 31 will move upwardly with relation to the seat 12, compressing the springs 40.

I also provide a relatively heavy coiled spring 50 to act as a buffer spring after a certain amount of downward movement of the vehicle frame and after a certain amount of extension of the coiled spring 30. The coiled spring 50 is preferably placed in a horizontal position, supported by a suitable support 51 on the lower seat 13 in such a position as to be compressed between the two vertical extensions 52 of the lower links 16 when the lower links have moved by a certain predetermined amount downwardly about their pivotal points 15. The spring 50 is of such strength as to act as an effectual buffer or spring stop against further downward movement of the links 16, thus stopping downward movement of the frame 11.

In the operation of this spring it will be seen that all vertical movements relatively between the axle 10 and frame 11 will be transformed into horizontal movements between the two pivotal points 18 which movements will be absorbed by the horizontally extending spring 30. When the axle 10 drops away from the frame 11, spring 30 will immediately contract and the frame 11 will stop and still be supported and will not drop with the axle 10. On the other hand, when the axle 10 moves upwardly, the spring 30 will be extended and the frame 11 will not be moved upwardly with the axle. Thus, the shocks to which the axle is subjected are not transmitted to the frame, but are absorbed in a horizontal direction by the spring 30.

Having described a preferred form of my invention, I claim:

1. A vehicle spring, embodying an upper and a lower seat adapted to be mounted upon a vehicle frame and axle, respectively, two pairs of links connected to said seats, the links of each pair being pivotally connected together and being pivotally connected one to the upper seat and one to the lower seat, the four links normally lying in a substantially diamond configuration, a tension spring adjustably connected between the two sets of links at the points where the links of each set are connected together, a downward extension from the lower link of each pair, and a buffer spring mounted on the lower seat and adapted to be compressed between the two extensions when the links have moved about the lower pivots by a predetermined amount.

2. A vehicle spring, embodying an upper and a lower seat adapted to be mounted on a vehicle frame and axle, respectively, two pairs of links connected to said seats, the links of each pair being pivotally connected together and being pivotally connected one to the upper seat and one to the lower seat, the four links normally lying in a substantially diamond configuration, a tension spring adjustably connected between the two sets of links at the points where the links of each set are connected together, a horizontal extension from the upper link of each pair, and compression springs between the upper seat and said extensions adapted to be compressed when the upper links move downwardly around their pivotal connections to the upper seat.

3. A vehicle spring, embodying an upper and a lower seat adapted to be mounted on a vehicle frame and axle, respectively, two pairs of links connected to said seats, the links of each pair being pivotally connected together and being pivotally connected one to the upper seat and one to the lower seat, the four links normally lying in a substantially diamond configuration, a tension spring adjustably connected between the two sets of links at the points where the links of each set are connected together, a downward extension from the lower link of each pair, a buffer spring mounted on the lower seat and adapted to be compressed between the two extensions when the links have moved about their lower pivots by a predetermined amount, a horizontal extension from the upper link of each pair, and compression springs between the upper seat and said extensions adapted to be compressed when the upper links move downwardly around their pivotal connections to the upper seat.

4. A vehicle spring, embodying two pairs of links, the links of each pair being pivotally connected together and being pivotally connected one to the vehicle frame and one to the vehicle axle, the four links normally lying in a substantially diamond configuration, a resilient element connected between the two sets of links at the points where the links of each set are connected together, and auxiliary resilient means normally out of engagement with the links and with which the links connect when they have moved a certain predetermined amount.

5. A vehicle spring, embodying two pairs of links, the links of each pair being pivotally connected together and being pivotally connected one to the vehicle frame and one to the vehicle axle, the four links normally lying in a substantially diamond configuration, a tension spring connected between the two sets of links at the points where the links of each set are connected together, a downward extension from the lower link of each pair, and a compression spring located between the two lower extensions and adapted to be compressed between them.

6. A vehicle spring, embodying two pairs of links, the links of each pair being pivotally connected together and being pivotally connected one to the vehicle frame and one to the vehicle axle, the four links normally lying in a substantially diamond configuration, a resilient element connected between the two sets of links at the points where the links of each set are connected together, a compression spring positioned between opposite links of opposite sets, and extensions of said links adapted to engage with said compression spring.

In witness that I claim the foregoing I have hereunto subscribed my name this 6th day of November, 1915.

CARL A. MILLER.

Witnesses:
JAMES T. BARKELEW,
ELWOOD H. BARKELEW.